US006993534B2

(12) United States Patent
Denesuk et al.

(10) Patent No.: US 6,993,534 B2
(45) Date of Patent: Jan. 31, 2006

(54) DATA STORE FOR KNOWLEDGE-BASED DATA MINING SYSTEM

(75) Inventors: Matthew Denesuk, San Jose, CA (US); Daniel Frederick Gruhl, San Jose, CA (US); Kevin Snow McCurley, San Jose, CA (US); Joerg Meyer, San Jose, CA (US); Sridhar Rajagopalan, San Jose, CA (US); Andrew S. Tomkins, San Jose, CA (US); Jason Yeong Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 10/142,673

(22) Filed: May 8, 2002

(65) Prior Publication Data

US 2003/0212699 A1     Nov. 13, 2003

(51) Int. Cl.
*G06F 17/30* (2006.01)

(52) U.S. Cl. ............. 707/102; 707/10; 707/101; 707/103; 707/104.1; 709/206; 709/224; 709/225; 713/168

(58) Field of Classification Search ............. 707/2, 707/3, 4, 6, 103, 10, 102, 101, 104, 104.1; 709/206, 224, 225; 713/168, 166; 705/10
See application file for complete search history.

(56) References Cited

U.S. PATENT DOCUMENTS

| | | | | |
|---|---|---|---|---|
| 5,737,592 A | * | 4/1998 | Nguyen et al. ............. 707/4 |
| 6,047,284 A | * | 4/2000 | Owens et al. .............. 707/4 |
| 6,092,064 A | * | 7/2000 | Aggarwal et al. ........... 707/6 |
| 6,101,502 A | * | 8/2000 | Heubner et al. ......... 707/103 R |
| 6,134,555 A |   | 10/2000 | Chadha et al. ............ 707/102 |
| 6,263,334 B1 |   | 7/2001 | Fayyad et al. ............ 707/5 |
| 6,292,894 B1 |   | 9/2001 | Chipman et al. .......... 713/168 |
| 6,330,563 B1 |   | 12/2001 | Heckerman et al. ....... 707/100 |
| 6,430,553 B1 | * | 8/2002 | Ferret ..................... 707/3 |
| 6,606,659 B1 |   | 8/2003 | Hegli et al. ............. 709/225 |
| 6,684,206 B2 | * | 1/2004 | Chen et al. .............. 707/3 |
| 6,691,105 B1 |   | 2/2004 | Virdy ..................... 707/3 |
| 6,754,672 B1 | * | 6/2004 | McLauchlin ............ 707/104.1 |
| 6,768,986 B2 | * | 7/2004 | Cras et al. ............... 702/2 |

(Continued)

FOREIGN PATENT DOCUMENTS

EP     0797161 A2     3/1997

(Continued)

OTHER PUBLICATIONS

Publication: "Using Collaborative Filtering to Weave an Information Tapestry". Goldberg et al. Communications of the ACM, vol. 35, No. 12, pp. 61-70. Dec., 1992.

(Continued)

*Primary Examiner*—Thuy N. Pardo
(74) *Attorney, Agent, or Firm*—John L. Rogitz (57) ABSTRACT

In a data mining system, data is gathered into a data store using, e.g., a Web crawler. The data is classified into entities and stored into underlying vertical and horizontal tables respectively representing miner outputs and entities that can be the subjects of indexing. Data miners use rules to process the entities and append respective keys to the entities representing characteristics of the entities as derived from rules embodied in the miners, with the keys being associated with the entities in the tables. With these keys, characteristics of entities as defined by disparate expert authors of the data miners are identified for use in responding to complex data requests from customers.

54 Claims, 3 Drawing Sheets

OVERALL FLOW

U.S. PATENT DOCUMENTS

| | | |
|---|---|---|
| 6,769,016 B2 | 7/2004 | Rothwell et al. ............ 709/206 |
| 6,839,680 B1 * | 1/2005 | Liu et al. ...................... 705/10 |
| 6,839,707 B2 | 1/2005 | Lee et al. ....................... 707/8 |
| 6,941,557 B1 * | 9/2005 | Jakobson et al. ........... 719/316 |
| 2002/0032740 A1 | 3/2002 | Stern et al. ................. 709/206 |
| 2002/0049773 A1 | 4/2002 | Jaramillo ................. 707/104.1 |
| 2002/0052928 A1 | 5/2002 | Stern et al. ................. 709/218 |
| 2002/0091671 A1 | 7/2002 | Prokoph ......................... 707/1 |
| 2002/0091681 A1 * | 7/2002 | Cras et al. ...................... 707/3 |
| 2002/0091912 A1 | 7/2002 | Chipman et al. ........... 713/168 |
| 2002/0091923 A1 | 7/2002 | Chipman .................... 713/168 |
| 2002/0144114 A1 * | 10/2002 | Barnard et al. ............. 713/166 |
| 2002/0156779 A1 | 10/2002 | Elliott et al. .................... 707/6 |
| 2003/0112270 A1 | 6/2003 | Newell et al. .............. 345/738 |

FOREIGN PATENT DOCUMENTS

| | | | |
|---|---|---|---|
| EP | 0797161 A3 | 3/1997 | |
| EP | 1111515 A2 | 12/2000 | |

OTHER PUBLICATIONS

Thuraisingham et al., "Understanding data mining and applying it to command, control, communications and intelligence environments", Computer Software and Applications Conference, 2000. The 24th Annual International, Oct. 25-27, pp. 171-175.

Related application, Denesuk et al., "Knowledge-Based Data Mining System", U.S. Appl. No. 10/141,327, filed May 8, 2002.

Related application, Denesuk et al., "Knowledge-Based Data Mining System", U.S. Appl. No. 10/141,686, filed May 8, 2002.

* cited by examiner

FIG. 1

FIG. 2
OVERALL FLOW

HORIZONTAL TABLE
FIG. 3

VERTICAL TABLE
FIG. 4

DATA STORE FOR KNOWLEDGE-BASED DATA MINING SYSTEM

FIELD OF THE INVENTION

The present invention relates generally to data mining systems.

BACKGROUND OF THE INVENTION

Data mining is the process of extracting user-desired information from a corpus of information. Perhaps the most widespread example of data mining is the search engine capability incorporated into most Web browsers, which allows users to enter key words and which then return a list of documents (sometimes listing several thousands of documents) that the user then sifts through to find the information he or she desires.

Existing search engines such as AltaVista, Google, Northern Light, FAST, and Inktomi work by "crawling" the Web, i.e., they access Web pages and pages to which the accessed pages hyperlink, generating an inverted index of words that occur on the Web pages. The index correlates words with the identifications (referred to as "uniform resource locators", or "URLs") of pages that have the key words in them. Queries are responded to by accessing the index using the requested key words as entering arguments, and then returning from the index the URLs that satisfy the queries. The page identifications that are returned are usually ranked by relevance using, e.g., link information or key word frequency of occurrence.

Despite the relevancy ranking used by most commercial search engines, finding particular types of information typically entails a great deal of mundane sifting through query results by a person. This is because expertise in a particular area often is required to separate the wheat from the chaff. Indeed, as recognized by the present invention, it may be the case that one expert is required to process documents using his or her expert criteria to winnow out a subset of the documents, and a second expert must then use his or her expert criteria to locate the required information in the subset from the first expert. This is labor-intensive and mundane and, despite being merely a necessary precursor to the higher level work of using the data, can consume more time than any other phase of a project.

Consider, for example, responding to a complex marketing question, such as, "what do our commercial customers in the Pacific Northwest think of our competitor's health care products in terms of brand name strength and value?" An analysis of Web pages might begin with a key word search using the name of the competitor, but then considerable expert time would be required to eliminate perhaps many thousands of otherwise relevant documents, such as government reports, that might be useless in responding to the question. Many more documents might remain after the first filtering step that are even more afield, such as teenager chat room documents, that might mention the competitor's name but that would require expertise in what types of demographics constitute the targeted segment to eliminate.

Or consider the simple question, "Is Adobe Acrobat® compatible with MS Word®?" This simple query, posed to one of the above-mentioned search engines, yielded a results set of 33 million Web pages, most of which would not have contained the "yes" or "no" answer that is sought. Eliminating the useless pages would require an expert to look at each page and determine whether it was the type of page that might contain information on program compatibility. Another expert might then be required to examine the pages passed on from the first expert to determine if, in fact, the pages contained the answer to the specific question that was posed. It will readily be appreciated that cascading expert rules to sift through a large body of information can consume an excessive amount of time.

SUMMARY OF THE INVENTION

A system including a data store containing entities and at least one lower level analysis engine communicating with the data store and generating an output using a first set of rules. At least one higher level analysis engine receives the output of the lower level analysis engine and generates an output using a second set of rules. The outputs are associated with entities in the data store.

In one exemplary, non-limiting embodiment, the data store can be a database and may include vertical tables and horizontal tables. The vertical tables can be entered using one of the outputs and the horizontal tables can be entered using an entity identification that encodes a corresponding entity identification and entity type. The outputs may be keys representing respective characteristics of the associated entity. The data store alternatively may be, e.g., a file system.

If desired, an indexer can be associated with the data store, as can a fast, semiconductor-implemented cache and a query processor to execute queries from at least one analysis engine. Also, work queues may be associated with analysis engines.

The preferred non-limiting indexer includes indices of keys and key values found in the entity data storage structures, such as tables. It may also contain Boolean indices storing "yes" or "no" values to queries of the form, "does key k have value v?". Moreover, the indexer can contain range indices storing ranges of key values, as well as text indices. The indexer can be, if desired, a generalization of an inverted file text indexer that indexes web documents and that provides a keyword search application programming interface (API) to the documents.

Moreover, the preferred indexer can hold defined keys for a particular entity to allow boolean queries. Further, the indexer can contain graph data to support inlink and outlink queries. Index tokenization advantageously can be decoupled from indexing in the indexer.

In another aspect, method for storing data to support a knowledge-based data mining system includes storing entities in at least one data store in both horizontal tables and vertical tables. The method further includes communicating with the data store using at least a first analysis engine, and generating an output using a first set of rules associated with the first analysis engine. As set forth further below, the method further includes sending the output to at least a second analysis engine and then generating an output using a second set of rules associated with the second engine. The outputs are associated with entities in the data store.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
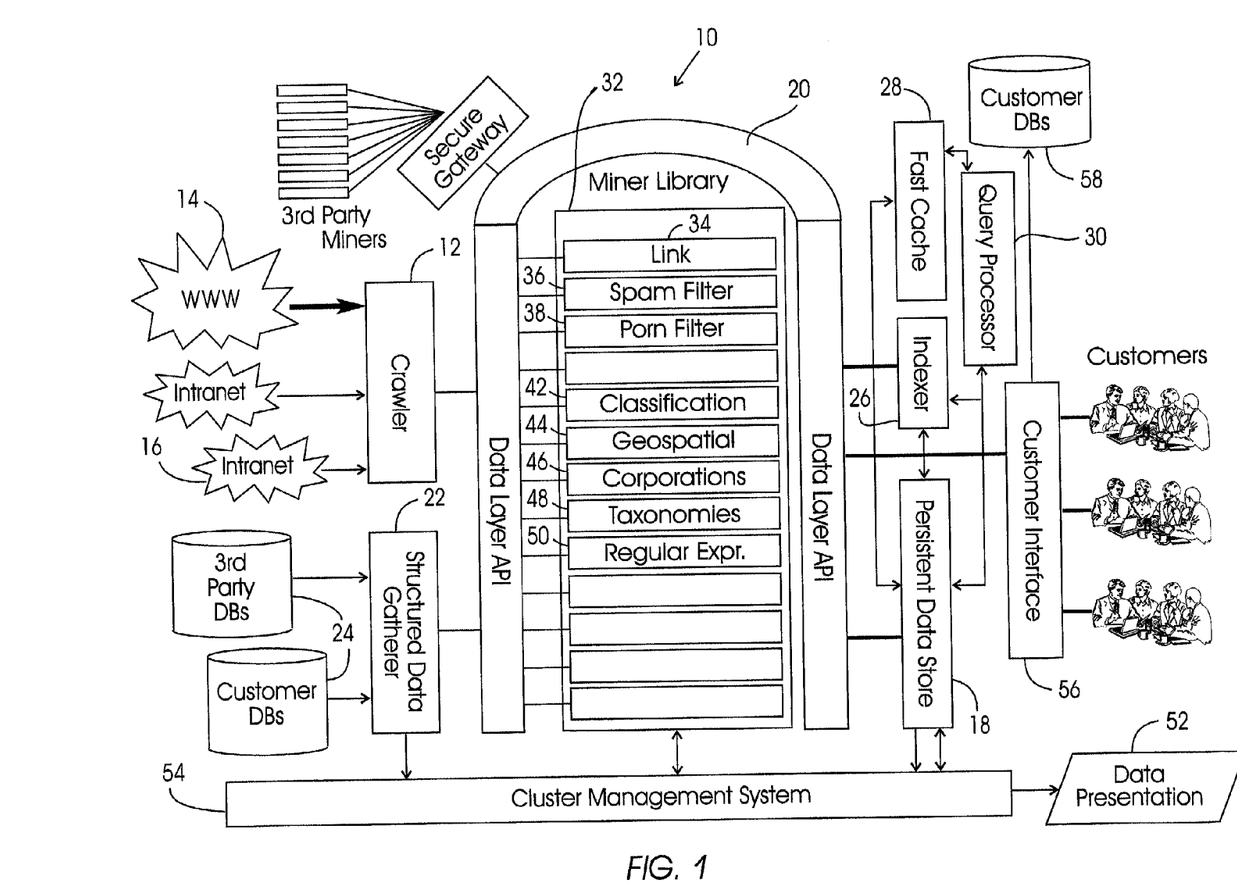
FIG. 1 is a block diagram of a preferred system architecture.

Referring initially to FIG. 1, a system is shown, generally designated 10, for responding to customer requests for data. The system 10 essentially integrates the knowledge of many experts to sift through a large corpus of data to respond to what might be relatively complex requests for information, such as those discussed above.

In non-limiting embodiments, the system 10 can be used for enterprise data analysis, competitive intelligence, trending, discovery, web portal services, clustering and taxonomy creation. Also, the system 10 can be used to support targeted functions which require significant embedded expertise such as a suite of procurement-specific services (of interest to a particular part of the enterprise).

The system 10 can be hosted at a single vendor location on one or a cluster of processors to respond to customer requests for data in a service format. Or, portions of the system 10 can be provided to customers for execution of data mining at customer facilities.

As set forth in further detail below, the system 10 includes a data gathering layer, a data storage layer, a data mining layer, a data presentation layer, and a system management layer. Commencing at the left in FIG. 1 and first addressing the data gathering layer, a Web crawler 12 accesses the World Wide Web 14 (and if desired other portions of the Internet). Intranets 16, for example, may also be accessed by the crawler 12, including proprietary information available only through proper authentication. Preferably, the crawler 12 continuously crawls the Web 14, with some pages being crawled more often than others based on frequency of page updates and other criteria, and outputs the crawled pages to a data store 18 using a data layer application programming interface (API) 20. In one preferred, non-limiting embodiment, the interface 20 is IBM's service-oriented protocol known as "Vinci xTalk", which is a lightweight XML-based protocol coupled with a set of usage conventions covering monitoring, logging, and data transfer. Network-level APIs within the system are specified in terms of xTAlk frames.

Also, the preferred crawler includes a feedback channel, whereby its operation may be changed as desired. In one preferred, non-limiting embodiment, the crawler 12 is that disclosed in U.S. Pat. No. 6,263,364, incorporated herein by reference, or the crawler set forth in IBM's co-pending U.S. patent application Ser. No. 09/239,921 entitled "SYSTEM AND METHOD FOR FOCUSSED WEB CRAWLING", also incorporated herein by reference. In addition to obtaining data using the crawler 12, the system 10 can include, if desired, a structured data gatherer 22 that processes data from customer and third party databases 24 and sends the processed data to the data store 18.

With respect to the data store 18, in one embodiment the data store 18 is a relational database system (RDBMS) such as IBM's DB2 system. In other embodiments, other systems, such as file systems, can be used. The disclosure below applies to both types of data stores.

In one embodiment, the store 18 can include a centralized program executing on a single computer or on multiple computers. The below-described miners can execute on independent computers, making requests to the store program to read and write data. Alternatively, the store 18 can be distributed across multiple computers, with the miners executing in parallel on those computers. In such an embodiment, a document can be read from the local portion of the store into memory, passed through in-memory through a chain of dependent or independent miners, and written back into the store, to facilitate efficient use of resources. Indeed, both architectures might exist in the same system 10, recognizing that some miners operate better in the second architecture (e.g., miners that operate on a per-page basis) while other miners might require the additional overhead of the first architecture.

The data store 18 is associated with an indexer 26 and, if desired, a fast, semiconductor-implemented cache 28. A query processor 30 can access the cache 28, indexer 26, and data store 18 to execute miner queries as set forth below. Miner work queues, discussed below, can be implemented as part of the data storage layer of the system 10.

The data store 18 contains a relatively large corpus of data, e.g., Web page data from the crawler 12. Also, the data store 18 contains entities that represent the underlying data, as set forth further below. These entities have respective universal identities (UEIDs) that encode the entity identification and entity type, e.g., "web page", "hyperlink", "person", "corporation", "article". Also, entities can contain keys with associated key values as appended to the entities by the below-described data miners. The page entity, for example, is processed by a miner that creates a key called "Crawl: Content" which contains the http content of the associated webpage (the key value is thus relatively long). In any case, the entities can be stored in a file system, a database system such as DB2 in which they are represented in both horizontal and vertical tables, or other storage system.

The indexer 26 includes, among other things, indices of keys and key values found in the store. The indexer 26 can contain Boolean indices, which store "yes" or "no" values to queries of the form, "does key k have value v?" Also, the indexer 26 can contain range indices, which store ranges of key values, e.g., geographic ranges, text indices, which are conventional indices for the underlying date, and other indices as desired.

In any case, the preferred indices (and, when the data store is a database, the data storage tables) do not indicate where on, e.g., a Web page a particular name or text might occur, but only that a page has a particular characteristic, or that a particular textual element appears somewhere on the page. In this way, the relatively high granularity of the system 10 data store requires less storage space than would otherwise be required, facilitating practical implementation. If desired, however, it may be indicated where on, e.g., a Web page a particular name or text might occur.

With respect to additional details of the data storage layer of the system 10, the preferred, non-limiting indexer 26 is a generalization of a conventional inverted file text indexer. In one instantiation, it indexes web documents and provides a keyword search application programming interface (API) to the documents. The set of keywords associated with a document could be simply the words of the document, or it could be augmented by the miners discussed below with additional information as necessary, such as geographic locations on the page, proper names, references to products or restaurants or other entities known to the system 10, results of semantic analysis of the page, and so forth. The keyword search API then allows queries to include any of these extended sets of keywords.

In other instantiations, the indexer 26 holds defined keys for a particular entity to allow boolean queries, or graph data to support inlink and outlink queries, and so forth. To provide this generality, tokenization is decoupled from indexing. More particularly, the indexer 26 expects to receive a stream of tokens rather than a stream of documents. Accordingly, tokenizing is undertaken prior to indexing. With each indexed token, the token location (the token offset position in the stream) is stored along with user-defined token data, which can be arbitrary. This simplified model facilitates efficient indexing and provides a general purpose API for use in a variety of applications. Moreover, decoupling allows tokens from different embodiments of rules (e.g., from different miners) to be indexed together.

Several versions of the indexer 26 may simultaneously execute. For simplicity, a "primary" text indexer is considered that holds tokens corresponding to the entire set of crawled pages. As discussed below in relation to the data miners of the present invention, miners attach "keys" to entities that are stored in the data store 18. Tokenizers associated with the indexer 26 follow exactly this approach. In one nonlimiting embodiment, the textual tokenizer can be based on the TAF (Text Analysis Framework) tokenizer produced by IBM Research and IBM Software in Boeblingen. This tokenizer reads page data, and writes for each page the result of base tokenization. Other tokenizers can then consume that data, or consume the raw page data as they choose, and write other tokens to the store. For instance, a tokenizer might match proper names and tag them as such, and another might read only the output of the proper name tokenizer, and might write tokens containing metadata mapping proper names to particular known entities elsewhere in the system 10. All of these tokenizers register with the primary indexer 26.

Having set forth details of the preferred, non-limiting indexer 26, attention is directed to the query processor 30. Streams of data from the data store 18 may be requested by the below-described miners using an extensible query language to invoke the query processor 30. The paradigm for accessing the query processor 30 is exactly the same as the paradigm for accessing the indexer 26, i.e., the requester sends a service-specific query (in this case, a statement in an extensible query language), and receives back from the query processor 30 a data stream. The query might involve combining several streams using standard stream combinators (boolean operators such as AND and OR, database join operators such as inner and outer joins, sort operators, and operators that augment a stream with additional information by, e.g., augmenting each UEID in the stream with the value of a certain key). The query language can join together arbitrary streams.

As mentioned above, the data mining layer of the system 10 includes a miner library 32 that contains software-implemented data miners which communicate with the data layer API 20 and, hence, with the data storage layer. In the exemplary, non-limiting embodiment shown, the miner library 32 includes a link miner 34 which returns links to/from a page, a spam filter 36 for identifying "spam" in the data store 18, a porn filter 38 for identifying pornographic pages in the data store 18, a classification miner 42 that classifies pages based on the occurrence of patterns of terms in the pages, a geospatial miner 44 which identifies any geographic information on a Web page, a corporations miner 46, a taxonomies miner 48 that returns pages having a predefined taxonomy category, a regular expression (regex) miner 50 that provides a stream of pages containing a defined regex, and so on.

By "miner" or "data mining element" is meant an analysis engine that generates an output, and specifically an output that can include one or more keys representing characteristics of an entity, using a set of rules. These rules can be heuristically determined, and can include statistically-based rules. By way of non-limiting example, the "porn filter" miner 38 might determine whether a Web page contains pornography using image analysis techniques, and append a key and Boolean key value to a page that indicates "porn=yes" or "porn=no". As one non-limiting example, the porn miner can use the principles set forth in IBM's U.S. Pat. No. 6,295,559. Or, the corporations miner 46 might determine whether a particular page is a corporate page using word association rules, URL analysis, or other method, and then append a key to the page that indicates the result of the miner's analysis. Yet again, the miner that establishes the spam filter 36 can use, e.g., the principles set forth in IBM's U.S. Pat. No. 6,266,692 to append keys to Web pages or emails indicating whether they are "spam". Still further, the geospatial miner 44 might append a key to a Web page representing a latitude and longitude range associated with the subject or author of the page, based on rules for deriving such information. As one non-limiting example, the geospatial miner can use the principles set forth in IBM's U.S. Pat. No. 6,285,996. All of the above-referenced patents are incorporated herein by reference. It is to be appreciated that the particular types of miners and the particular rules employed by each miner may vary without affecting the scope or operation of the present invention.

In any case, the data miners are modular components that have specific input and output specifications. They may be written in any language, and may range from, e.g., a few lines of simple perl to spot keywords, to tens of thousands of lines of code (or more) to perform complex distributed operations. Large problems may be broken into smaller pieces, each of which may be easily tackled by a single miner or miner writer. The resulting intermediate results can be easily viewed, checked and debugged, and may also be of independent interest to other miner writers. In this way, miners represent the service-oriented architecture equivalent of object-oriented design. Miners are specified in terms of the data, usually as indicated by the below-described keys, that must be available when they start, and the data (including other keys) that they will create during successful processing.

Specifically, in a preferred embodiment a miner can consume work from a system-managed work queue, based on one or more dependencies that are specified by the miner. As an example, a miner ("Miner A") that is interested in processing pages that contain references to certain personalities or certain geographic locations might register a dependency on the geospatial miner 44 and a person miner. The work queue for Miner A will then be continuously updated to contain entities that have been processed by the geospatial and person miners as indicated by keys appended to the entities in the data store by the geospatial and person miners, but not yet by Miner A. After processing those entities, Miner A could append its own key or keys to the processed entities using, when the data store is a database, existing entity tables, or it could create new entities (with corresponding tables when the data store is implemented as a database), with each key representing a characteristic of the entity. Miners that extract references to particular products, brand names, people, industry segments, artists, and so forth operate in this mode.

On the other hand, a miner might not consume work from a queue, but rather might register freshness requirements with the below-described management system controlling how often and in what environment the miner must be run. Other miners that, for instance, run a weekly aggregate computation might ask the below-discussed management system to initiate one or more instances of the miner in order to complete a weekly build of the resulting aggregate table or data structure, again using as input entities that have the appropriate keys appended to them.

Miners thus read long-running persistent and reliable streams of raw content, as well as processed data created by other miners, from the data store 18. These miners, and in fact many miners within the system 10, will consume and process data. The two models for data access discussed above include random access to a particular entity or set of entities, and stream access to an enumeration of entities. To perform a random access on the data store 18, a miner simply requests relevant pieces of the entity in question using the UEID. To receive a data stream, an enumeration is initiated by requesting data from the data store 18 using the indexer 26 or using the query processor 30. For instance, miners with more sophisticated data requirements may specify to the query processor 30 complex queries that may require access to multiple components, with query optimization being conventionally undertaken and streams of data generated in return. Such queries could entail database joins across multiple tables, index lookups including text search, range queries, geographic lookups, and composition of smaller result sets from many different sources within the system. Whether derived from the indexer 26 or query processor 30, enumerations provide persistence, and can be accessed either in serial or in parallel depending on the nature of the processing.

Miners write back the results of their processing to the data store 18 for other miners and end users to access. As discussed above, to write data back into the store 18 for other miners to access, a miner simply creates the new keys and values it wishes to attach to the entity, then perform a store write operation.

The results of a particular customer request for information as provided by the miners of the present invention may be presented on a data presentation layer 52. The results may be printed, or presented in audio-video form, or other form as desired. A cluster management subsystem layer 54 manages the above-discussed layers as more fully set forth below. If desired, a customer interface 56 can access the data layer API 20 and customer databases 58, to facilitate entering and responding to customer requests for information.

In accordance with the presently preferred embodiment, the management subsystem layer 54 schedules, initiates, monitors, and logs operations within the various components. End applications draw results from rendered tables, from the data store 18, or from real-time query-processing miners.

In a preferred, non-limiting embodiment, a large cluster of computers hosts the system 10 and management subsystem layer 54. In addition to managing the miners, the managements system 54 detects hardware and software failures in the cluster and programmatically recovers from the failures, notifying system managers as appropriate. The management subsystem layer 54 also provides functionality such as relocation, load balancing and scheduling for each software component.

All system 10 events are gathered into a single information server, which maintains status, statistics, logging, and error codes from applications and infrastructure components. Events are generated from a wide range of sources including error classes used by software components in the cluster, a DB2 event and log monitor associated with the data store 18, system and network monitoring components, and so-called "Nanny" agents that are part of the management subsystem layer 54 and that execute on respective computers of the cluster.

The preferred "Nanny" agents start, stop, and monitor processes, and track computer resources, on their respective computers. They undertake and/or monitor "pings", disk utilization, memory utilization, processor utilization, kernel resource utilization (processes, sockets, etc), and process controls including start, stop, killall. "Nanny" agents also receive status from individual miners running on their respective computers, including log messages, error reports, statistics, number of waiting documents, number of processed documents per second, net document flow rate, processing rate in bytes or entities per second, and other miner-specific status reports.

Figure 2:
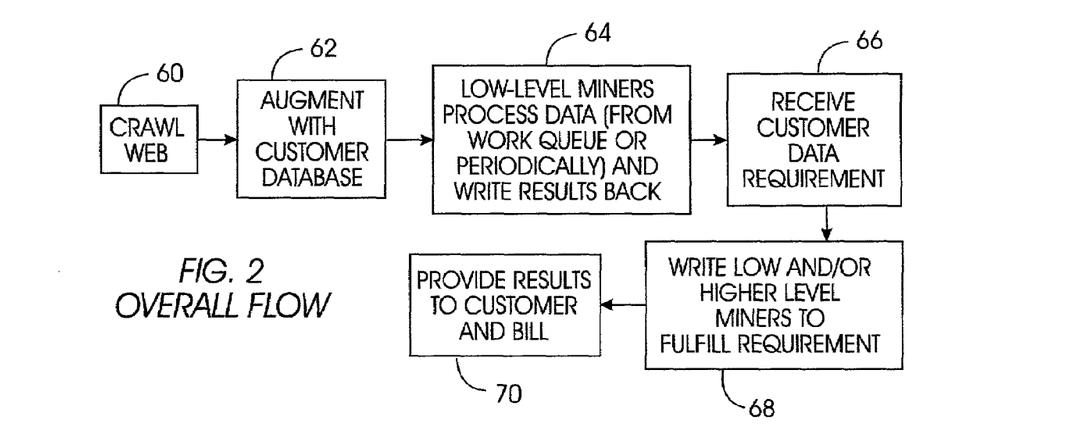
FIG. 2 is a flow chart of the overall logic.

FIG. 2 sets forth the overall logic of system 10 operation discussed above. Commencing at block 60, the crawler 12 crawls the Web 14 to add data to the data store 18. If desired, the data store 18 can be augmented with data at block 62 from the databases 24 by means of the data gatherer 22.

Once the data store 18 contains data, the logic may flow to block 64, wherein at least some of the miners, which might be thought of as "low level" miners, access data and process it in accordance with the disclosure above. The low level miners write the results back to the data store 18. For example, filtering miners such as the SPAM filter 36 and porn filter 38 might process all Web pages in the data store 18 and write back respective keys to the corresponding entities indicating whether each site is SPAM or pornography. Moreover, a detag miner can be invoked on each page to process the page contents by removing hypertext markup language (html) mark-ups, leaving only the raw text, and then append a "detag" key so indicating to each corresponding entity.

Moving to block 66, customer requests for information can be received. At block 68, additional low level miners can be written in response, or high level miners, if required and not yet written, can be created. High level miners can be thought of as miners that specify dependencies on the outputs of other miners, i.e., that require entities for processing that have been tagged with keys output by lower level miners.

An example of a higher level miner might be one that responds to the query, "what do our commercial customers in the Pacific Northwest think of our competitor's health care products in terms of brand name strength and value?" Such a miner might specify that it wishes to receive only pages from the Pacific Northwest, as indicated by a geospatial key appended to entities by the geospatial miner, and only if the competitor's name is featured in the entity, as indicated by a key appended to the entity by a proper name miner. Many such dependencies might be hypothesized, it being understood that the expert who might specify the dependencies of such a miner uses heuristics according to his or her expertise without having to know how the expert who wrote, e.g., the geospatial miner arrived at his or her solution. The results are provided to the customer at block 70 and the customer is billed, on a per request basis or on a subscription basis.

Figure 3:
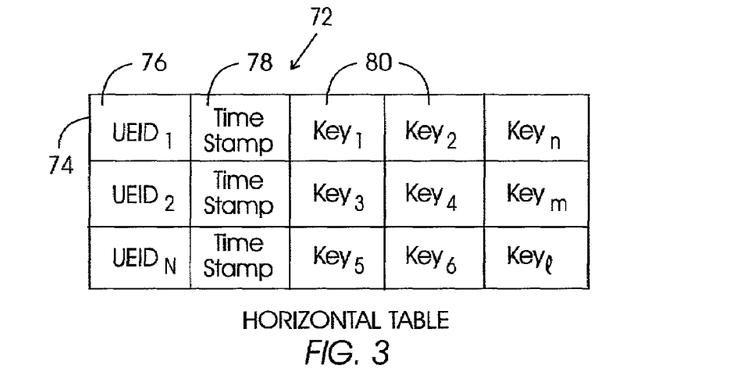
FIG. 3 is a schematic diagram of a horizontal table.
Figure 4:
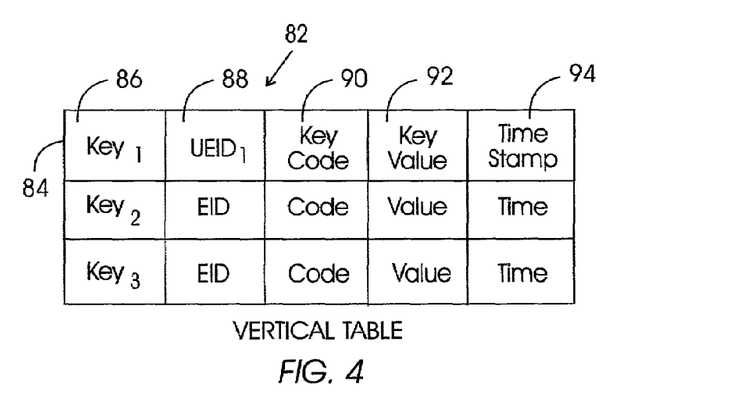
FIG. 4 is a schematic diagram of a vertical table.

FIGS. 3 and 4 illustrate the structure of the horizontal and vertical tables that can be used when, by way of non-limiting example, the data store is implemented by a database system such as DB2. A horizontal table 72 is shown in FIG. 3 wherein each row 74 represents an entity. Each row has a UEID column 76, if desired a timestamp column 78, and plural key columns 80. In contrast, a vertical table 82 shown in FIG. 4 includes plural rows 84, each including a single key column 86, UEID column 88, key code column 90 indicating the type of key, and a key value column 92 indicating the value of the key, e.g., Boolean value, range value, etc. A timestamp column 94 can be included if desired, indicating the time the associated entry was made in the table.

From the above discussion it is to be appreciated that the data store 18, by means of the tables 72, 82 in the database implementation, abstracts the layout of the actual data, so that the decision on which type of tables to use for a specific entity can be made to benefit performance for the access patterns that are expected to be typical for that entity. The preferred data store 18 also abstracts DB2's limits on row length by automatically using either VARCHARs or BLOBs to store values that are longer than the maximum row length. APIs are provided to help programmers access the DB2 database directly to write code that is independent of the physical layout of the data.

For example, the crawler 12 writes the Crawl:Content key, the Crawl:Header key, and a number of extracted metadata keys such as the URL, the fetch latency, the last date on which the page changed, the server, the HTTP return code, and so on. Within the data store 18 when implemented as a database, this information is all written into a single horizontal table with one column for each crawler key. It is written only by the crawler 12, but it may be read by any miner having permission. Miners requiring the content of a page need only ask for the value of the Crawl:Content key, and the data store 18 maps to the appropriate table.

To facilitate this computation, the data store 18 can if desired provide a data dictionary whose purpose is to provide information on the mapping of a key to an actual location within the relational database. In addition, it provides ancillary information such as the type and owner of the key. Miners that write multiple keys may write those keys into a specific horizontal table so that many keys can be written in a single row update operation.

As mentioned above, a number of miners, including the crawler 12, operate most naturally at the page level to create and consume per-page information. However, other miners can also operate on entities other than raw pages. For instance, some miners such as a link-based spam filter 36 operate on entire web sites to decide whether an entire site is spam or not. Other miners might operate on phrases, or on proper names, or company names, or places, restaurants, employers, and so forth. Each such category represents a separate entity, and requires its own set of horizontal and vertical tables (or other data storage structure) within the data store 18. Accordingly, in the same way that the crawler 12 writes to a horizontal table within the page entity in the database implementation, the corporation miner 46 might populate a horizontal table for corporations. Other miners that wish to attach key-value pairs to corporations might access keys appended to entities by the corporation miner 46, and then write other keys into other data structure of the corporation entity.

Figure 5:
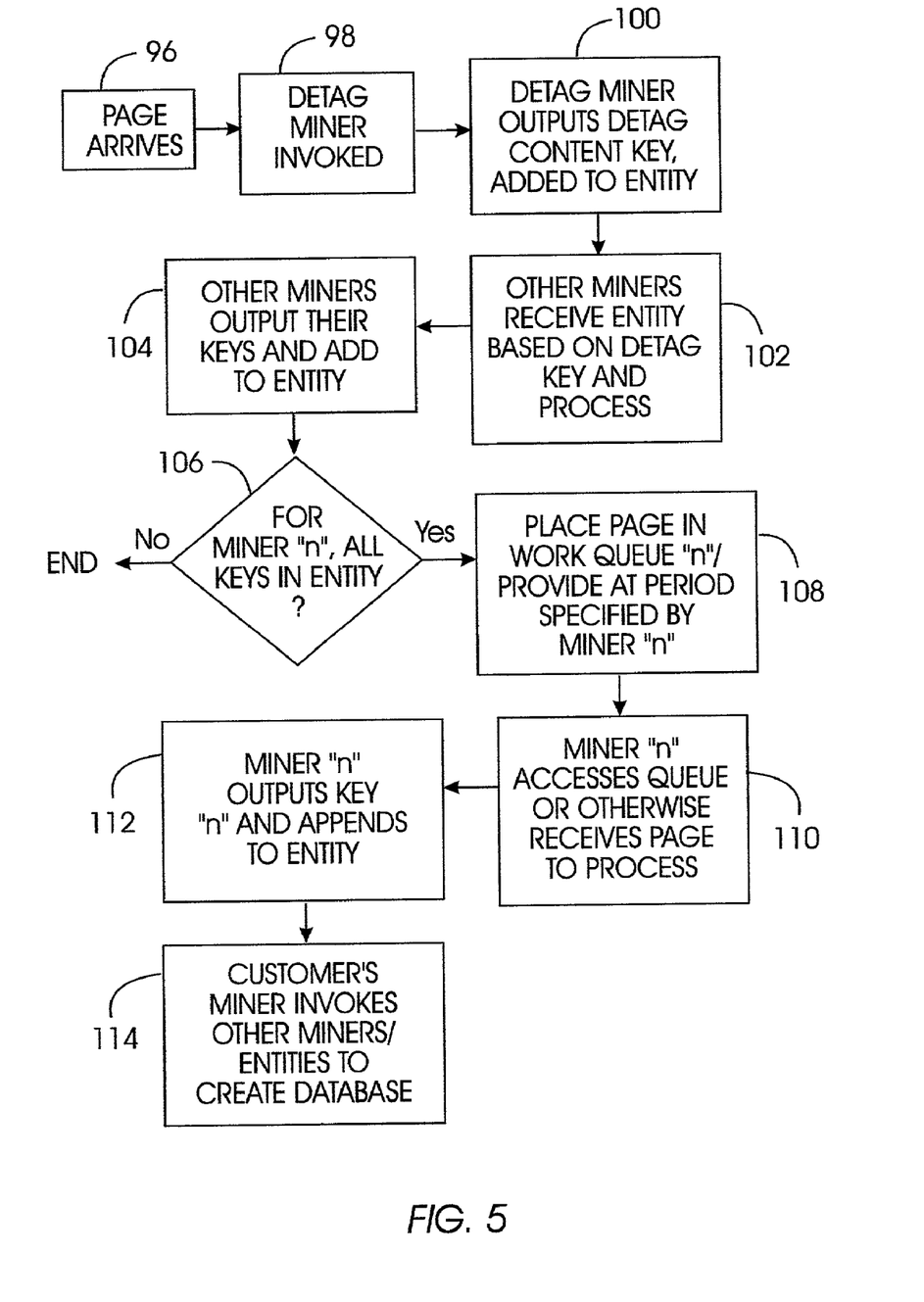
FIG. 5 is a flow chart of an exemplary miner logic.

FIG. 5 shows a specific logic flow that might be followed when a Web page arrives from the crawler 12 at block 96. At block 98 a detag miner can be invoked to process the page at block 100 by stripping html markups, leaving only the raw text, and appending a "detag" key so indicating to the entity.

Proceeding to block 102, other miners can receive the entity in accordance with principles set forth above by having the system manager 54 deliver the entity to such other miners based on the detag key. At block 104 the other miners process the data underlying the entity and can append their own keys to the entity's data structure entry, in, e.g., both the horizontal table representing the entity and the associated vertical table representing the key when the data store is implemented as a database. Also, some miners might extract information, e.g., a corporate name from, e.g., a page entity and create additional entity data storage structures (such as files or tables) representing such entities, e.g., corporation entities.

After initial miner processing, the logic can move to decision diamond 106, wherein it is determined whether still further miners, e.g., an $n^{th}$ miner, has requested entities having predetermined keys. If all keys required as input by the $n^{th}$ miner are present in an entity, the entity is provided to the $n^{th}$ miner at block 108 by, e.g., placing the entity in the miner's work queue. The $n^{th}$ miner then accesses the entity at block 110 by, e.g., accessing its work queue to process the entity and/or processing the underlying data of the entity. At block 112, the $n^{th}$ miner outputs its own key or keys and enters these keys in the entity data structures as appropriate to associate the key or keys with the entity. Then, at block 114 a customer's miner can invoke other miners and/or access entities as appropriate to create a database containing information sought by the customer.

The system 10 described herein can be used for many specific customer applications. One such application is an "action link"/"drill note" application in which a document is fed into the system, and system miners identify important "entities" in the document (e.g., people, places, events) based on rules. A compilation miner in the system 10 then compiles a dossier or other form of information collection on each of these entities. The dossier (or equivalent) is then linked to the entity in the original document.

The dossier or equivalent may be a mini-portal for that entity, e.g., it may look like a Yahoo®-type directory specifically for that entity. Accordingly, if the entity is a person, one may have subcategories for that person consisting of addresses associated with that person, people associated with that person, locations associated with that person, industries associated with that person, publication about that person, etc. The entities that are selected to be "action-linked" are determined by the compilation miner, preferably in accord with a tunable propensity function or other rule that can be heuristically determined.

As another non-limiting example of how the system 10 can be used, a "Legal Leads Finder and Builder" application can include the above-mentioned "action links"/"drill notes" as one component, and also look for probability linkages between "entities," wherein the entities are contained in the data store 18, but at least some of the linkage elements sought may not be. As an example, consider a litigation case in which John Doe and Jane Smith (people entities) are both listed in a people entity data structure, but the data in the data store 18 contains no manifest relationship between them. A Legal Leads Finder and Builder miner identifies the two entities as important entities based on a set of rules, and then determines whether other entities exist through which the two people entities might be related. For example, it might happen that both people are on the Board of a particular company or charity; they may have published a paper together; they may have been mentioned in the press as colleagues or partners in some kind of deal; and so on. In these cases, the linking entity (e.g., the company for which both John and Jane are Board members; the paper which they published together) may be regarded a "bridging entity" and be included in discovery requests.

Consequently, the discovery phase of litigation can be expanded to request not only documents pertaining directly to certain topics, people, or events, but also to locate documents that are relevant to the "bridging entities" through external data sources.

As another non-limiting example of how the system 10 can be used, a competitive product marketing application can be implemented. Information about a set of products can be fed into the system 10, and miners can be constructed to unambiguously identify and classify mentions of the product based on the context of the mention. For example, Tide® as a detergent product can be distinguished from the natural phenomena of tides. Also, a classification/profiler miner, preferably using statistical means to classify/profile a mention based on a set of previously classified/profiled mentions, is used to classify the context of the mentions. Further, a geography miner can be used to determine appropriate geographic linkages associated with the source in which the mention occurs. The application can then be made to provide a finely divided measure of the "ink" or "buzz" that some set of their products are receiving and compare this "ink" or "buzz" with that corresponding to competitive products. This information can be presented on a map, for example, with different colors or brightness levels representing the magnitude of "ink" or "buzz." This information can also be tracked over time, assisting in the identification of positive or negative trends that deserve attention. As another feature, geographically and demographically segmented data representing ad spending or other marketing activities associated with a product can be fed into a system, and a miner can test for forward correlations of such activities to "ink" or "buzz," thereby providing some measure of the effectiveness of the marketing activities.

While the particular DATA STORE FOR KNOWLEDGE-BASED DATA MINING SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A system, comprising:
   at least one data store containing entities;
   at least one lower level analysis engine communicating with the data store and generating an output using a first set of rules;
   at least one higher level analysis engine receiving the output of the lower level analysis engine and generating an output using a second set of rules, wherein the outputs are associated with entities in the data store; and
   an indexer associated with the data store, wherein tokenization is decoupled from indexing in the indexer.

2. The system of claim 1, wherein the data store includes vertical tables and horizontal tables, and the vertical tables are entered using one of the outputs and the horizontal tables are entered using an entity identification.

3. The system of claim 1, wherein the outputs are keys representing respective characteristics of the associated entity.

4. The system of claim 1, wherein the data store is a relational database system.

5. The system of claim 1, wherein the data store is a file system.

6. The system of claim 1, further comprising a fast, semiconductor-implemented cache associated with the indexer and data store.

7. The system of claim 6, further comprising a query processor accessing one or more of the cache, indexer, and data store to execute queries from at least one analysis engine.

8. The system of claim 7, further comprising at least one work queue associated with at least one analysis engine.

9. The system of claim 1, wherein an entity identification encodes a corresponding entity identification and entity type.

10. The system of claim 1, wherein the indexer includes indices of keys and key values found in the data store.

11. A system, comprising:
    at least one data store containing entities;
    at least one lower level analysis engine communicating with the data store and generating output using a first set of rules;
    at least one higher level analysis engine receiving the output of the lower level analysis engine and generating an output using a second set of rules, wherein the outputs are associated with entities in the data store; and
    an indexer associated with the data score, wherein the indexer includes indices of keys and key values found in the data store and further wherein the indexer contains Boolean indices storing "yes" or "no" values to queries of the form, "does key k have value v?".

12. A system, comprising:
    at least one data store containing entities;
    at least one lower level analysis engine communication with the data store and generating an output using a first set of rules;
    at least one higher level analysis engine receiving the output of the lower level analysis engine and generating an output using a second set of rules, wherein the outputs are associated with entities in the data store; and
    an indexer associated with the data store, wherein the indexer includes indices of keys and key values found in the data store and further wherein the indexer contains range indices storing ranges of key values.

13. The system of claim 10, wherein the indexer contains text indices.

14. A system, comprising:
    at least one data store containing entities;
    at least one lower level analysis engine communicating with the data store and generating an output using a first set of rules;
    at least one higher level analysis engine receiving the output of the lower level analysis engine and generating an output using a second set of rules, wherein the outputs are associated with entities in the data store; and an indexer associated with the data store, wherein the indexer includes indices and the data store includes tables that do not indicate where in an entity a particular name or text occurs, but only that an entity has a particular characteristic.

15. The system of claim 1, wherein the indexer is a generalization of an inverted file text indexer that indexes web documents and provides a keyword search application programming interface (API) to the documents.

16. The system of claim 1, wherein the indexer holds defined keys for a particular entity to allow Boolean queries.

17. A system, comprising:
at least one data store containing entities;
at least one lower level analysis engine communicating with the data store and generating an output using a first set of rules;
at least one higher level analysis engine receiving the output of the lower level analysis engine and generating an output using a second set of rules, wherein the outputs are associated with entities in the data store; and
an indexer associated with the data store, wherein the indexer contains graph data to support inlink and outlink queries.

18. A method for storing data to support a knowledge-band data mining system, comprising:
storing entities in at least one data store associated with an index;
communicating with the data store using at least a first analysis engine;
generating an output using a first set of rules associated with the first analysis engine;
sending the output to at least a second analysis engine;
generating an output using a second set of rules associated with the second engine; and
associating the outputs with entities, wherein the indexer contains graph data to support inlink and outlink queries.

19. The method of claim 18, wherein the data store includes vertical tables and horizontal tables, and the method comprises entering the vertical cables using one of the outputs.

20. The method of claim 18, wherein the data store includes vertical tables and horizontal cables, and the method comprises entering horizontal cables using an entity identification.

21. The method of claim 18, wherein the outputs are keys representing respective characteristics of the associated entity.

22. The method of claim 18, wherein the data score is a relational database system.

23. The method of claim 18, wherein the data score is a file system.

24. The method of claim 18, further comprising associating the indexer with the data store.

25. The method of claim 24, further comprising associating a fast, semiconductor-implemented cache with the indexer and data store.

26. The method of claim 25, further comprising accessing, with a query processor, one or more of the cache, indexer, and data store to execute queries from at least one analysis engine.

27. The method of claim 26, further comprising associating at least one work queue with at least one analysis engine.

28. The method of claim 18, wherein an entity identification encodes a corresponding entity identification and entity type.

29. The method of claim 24, wherein the indexer includes indices of keys and key values found in the data store.

30. A method for storing data to support a knowledge-based data mining system, comprising:
storing entities in at least one data store associated with an index;
communicating with the data store using at least a first analysis engine;
generating an output using a first set of rules associated with the first analysis engine;
sending the cutout to at least a second analysis engine;
generating an cutout using a second set of rules associated with the second engine; and
associating the cutouts with entities, wherein the Indexer includes indices of keys and key values found in the data store and further wherein the indexer contains Boolean indices storing "yes" or "no" values to queries of the form, "does key k have value v?".

31. A method for storing data to support a knowledge-based data mining system, comprising:
storing entities in at least one data store associated with an index;
communicating with the data store using at least a first analysis engine;
generating an output using a first set of rules associated with the first analysis engine;
sending the output to at least a second analysis engine;
generating an output using a second set of rules associated with the second engine; and
associating the outputs with entities, wherein the indexer includes indices of keys and key values found in the data store and further wherein the indexer contains range indices storing ranges of key values.

32. The method of claim 29, wherein the indexer contains text indices.

33. A method for storing data to support a knowledge-based data mining system, comprising:
storing entities in at least one data score associated with an index;
communicating with the data store using at least a first analysis engine;
generating an output using a first set of rules associated with the first analysis engine;
sending the output to at least a second analysis engine;
generating an output using a second set of rules associated with the second engine; and
associating the outputs with entities, wherein the indexer includes indices and the data store includes tables that do not indicate where in an entity a particular name or text occurs, but only that an entity has a particular characteristic.

34. The method of claim 24, wherein the indexer is a generalization of an inverted file text indexer that indexes web documents and provides a keyword search application programming interface (API) to the documents.

35. The method of claim 24, wherein the indexer holds defined keys for a particular entity to allow boolean queries.

36. A method for storing data to support a knowledge-based data mining system, comprising:
storing entities in at least one data store associated with an index;

communicating with the data store using at least a first analysis engine;
generating an output using a first set of rules associated with the first analysis engine;
sending the output to at least a second analysis engine;
generating an output using a second set of rules associated with the second engine; and
associating the outputs with entities, wherein tokenization is decoupled from indexing in the indexer.

37. A system for data mining, comprising:
means for storing entities in at least one data store in both horizontal tables and vertical tables, the data store being associated with an index;
means for communicating with the data store using at least a first analysis engine;
means for generating an output using a first set of rules associated with the first analysis engine;
means for sending the output to at least a second analysis engine;
means for generating an output wing a second set of rules associated with the second engine; and
means for associating the outputs with entities, wherein the indexer includes indices and the data store includes tables that do not indicate where in an entity a particular name or text occurs, but only that an entity has a particular characteristic.

38. The system of claim 37, comprising means fir entering the vertical tables using one of the outputs.

39. The system of claim 37, means for comprising entering horizontal tables using an entity identification.

40. The system of claim 37, wherein the outputs are keys representing respective characteristics of the associated entity.

41. The system of claim 37, wherein the data store is a relational database system.

42. The system of claim 37, wherein the data store is a file system.

43. The system of claim 37, further comprising means for associating an indexer with the data store.

44. The system of claim 43, further comprising means for associating a fast, semiconductor-implemented cache with the indexer and data store.

45. The system of claim 44, further comprising means for accessing, with a query processor, one or more of the cache, indexer, and data store to execute queries from at least one analysis engine.

46. The system of claim 45, further comprising means for associating at least one work queue with at least one analysis engine.

47. The system of claim 37, wherein an entity identification encodes a corresponding entity identification and entity type.

48. The system of claim 43, wherein the indexer includes indices of keys and key values found in the tables.

49. A system for data mining, comprising:
means for storing entities in at least one data store in both horizontal tables and vertical tables, the data store being associated wit an index;
means for communicating with the data store using at least a first analysis engine;
means for generating an output using a first set of rules associated with the first analysis engine;
means for sending the cutout to at least ,a second analysis engine;
means for generating an cutout using a second set of rules associated with the second engine; and
means for associating the cutouts with entities, wherein the indexer include indices of keys and key values found in the tables and further wherein the indexer contains Boolean indices storing "yes" or "no" values to queries of the form, "does key k have value v?".

50. The system of claim 48, wherein the indexer contains range indices storing ranges of key values.

51. The system of claim 48, wherein the indexer contains text indices.

52. The system of claim 43, wherein the indexer is a generalization of an inverted file text indexer that indexes web documents and provides a keyword search application programming interface (API) to the documents.

53. The system of claim 43, wherein the indexer holds defined keys for a particular entity to allow boolean queries.

54. A system for data mining, comprising:
means for storing entities in at least one data store in both horizontal tables and vertical tables, the data store being associated with an index;
means for communicating with the data store using at least a first analysis engine;
means for generating an cutout using a first set of rules associated with the first analysis engine;
means for sending the output to at least a second analysis engine;
means for generating an output using a second set of rules associated with the second engine; and
means for associating the outputs with entities, wherein the indexer contains graph data to support inlink and outlink queries.

* * * * *